United States Patent
Iikura et al.

(10) Patent No.: US 9,690,639 B2
(45) Date of Patent: Jun. 27, 2017

(54) FAILURE DETECTING APPARATUS AND FAILURE DETECTING METHOD USING PATTERNS INDICATING OCCURRENCES OF FAILURES

(71) Applicant: FUJITSU LIMITED, Kawasaki-shi, Kanagawa (JP)

(72) Inventors: Fumi Iikura, Shinagawa (JP); Yasuhide Matsumoto, Kawasaki (JP); Yukihiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 331 days.

(21) Appl. No.: 14/611,796

(22) Filed: Feb. 2, 2015

(65) Prior Publication Data
US 2015/0149829 A1    May 28, 2015

Related U.S. Application Data

(63) Continuation of application No. PCT/JP2012/070271, filed on Aug. 8, 2012.

(51) Int. Cl.
*G06F 11/00* (2006.01)
*G06F 11/07* (2006.01)
(Continued)

(52) U.S. Cl.
CPC ........ *G06F 11/0706* (2013.01); *G06F 11/079* (2013.01); *G06F 11/0751* (2013.01);
(Continued)

(58) Field of Classification Search
CPC ............... G06F 11/008; G06F 11/0706; G06F 11/0751; G06F 11/3072; G06F 11/3075; G06F 11/368
See application file for complete search history.

(56) References Cited

U.S. PATENT DOCUMENTS 8,751,417 B2 * 6/2014 Watanabe ........... G06F 11/0709
370/311
2008/0225732 A1    9/2008 Yoshizawa
(Continued)

FOREIGN PATENT DOCUMENTS

JP      2006-260056      9/2006
JP      2008-225912      9/2008
(Continued)

OTHER PUBLICATIONS

International Search Report mailed Oct. 23, 2012 in corresponding International application PCT/JP2012/070271.

*Primary Examiner* — Joseph Kudirka
(74) *Attorney, Agent, or Firm* — Staas & Halsey LLP

(57) ABSTRACT

A failure detecting apparatus has a storage unit that stores patterns, indicating occurrences of failures, of messages. The failure detecting apparatus executes a process that includes identifying, when a new message is output from a target to be monitored, a message to be replaced, which is output from the target to be monitored before the output of the new message and is not output from the target to be monitored after the output of the new message, extracting a pattern including the message to be replaced from the storage unit, registering a pattern resulting from substitution of the message to be replaced included in the extracted pattern in the storage unit with the new message, and detecting whether or not messages output from the target to be monitored include any of the patterns stored in the storage unit.

8 Claims, 13 Drawing Sheets

| NO. | PATTERN | NUMBER OF OCCUR-RENCES (ACTUAL MEASURE-MENT) | NUMBER OF FAILURES (ACTUAL MEASURE-MENT) | NUMBER OF OCCUR-RENCES (COPY) | NUMBER OF FAILURES (COPY) | FORMER NO. |
|---|---|---|---|---|---|---|
| 1 | ABCXY | 100 | 90 | 0 | 0 | |
| 2 | BCDWY | 101 | 89 | 0 | 0 | |
| 3 | CDEFXY | 102 | 75 | 0 | 0 | |
| 4 | ABEWX | ... | ... | | | |
| 5 | BEDWX | ... | ... | | | |
| 6 | DEFVX | ... | ... | | | |
| 7 | ABCXZ | 1 | 1 | 100 | 90 | 1 |
| 8 | BCDWZ | 0 | 0 | 101 | 89 | 2 |
| 9 | CDEFXZ | 0 | 0 | 102 | 75 | 3 |

(51) Int. Cl.
    *G06F 11/36*     (2006.01)
    *G06F 11/30*     (2006.01)
    *G06F 11/34*     (2006.01)

(52) U.S. Cl.
    CPC ...... G06F 11/0772 (2013.01); *G06F 11/3075* (2013.01); *G06F 11/3495* (2013.01); *G06F 11/368* (2013.01)

(56) References Cited

U.S. PATENT DOCUMENTS

| | | |
|---|---|---|
| 2012/0151282 A1 | 6/2012 | Watanabe et al. |
| 2012/0166879 A1 | 6/2012 | Watanabe et al. |
| 2014/0068356 A1 | 3/2014 | Watanabe et al. |

FOREIGN PATENT DOCUMENTS

| | | |
|---|---|---|
| JP | 2012-123694 | 6/2012 |
| JP | 2012-141802 | 7/2012 |
| WO | WO 2012/066650 A1 | 5/2012 |
| WO | WO 2012/160637 A1 | 11/2012 |

* cited by examiner

| MESSAGE | TIME OF START OF OCCURRENCE | TIME OF LAST OCCURRENCE | AVERAGE OCCURRENCE INTERVAL |
|---|---|---|---|
| A | ... AGO OR EARLIER | 8 HOURS AGO | 10 HOURS |
| B | ... AGO OR EARLIER | 4 HOURS AGO | 5 HOURS |
| C | ... AGO OR EARLIER | 5 HOURS AGO | 6 HOURS |
| P | ... AGO OR EARLIER | 6 HOURS AGO | 10 HOURS |
| Q | 4 HOURS AGO | 4 HOURS AGO | 4 HOURS |
| R | ... AGO OR EARLIER | 10 HOURS AGO | 14 HOURS |
| Y | ... AGO OR EARLIER | 14 HOURS AGO | 6 HOURS |
| Z | 12 HOURS AGO | 6 HOURS AGO | 8 HOURS |

FIG.4

| NO. | PATTERN | NUMBER OF OCCUR-RENCES (ACTUAL MEASURE-MENT) | NUMBER OF FAILURES (ACTUAL MEASURE-MENT) | NUMBER OF OCCUR-RENCES (COPY) | NUMBER OF FAILURES (COPY) | FORMER NO. |
|---|---|---|---|---|---|---|
| 1 | ABCXY | 100 | 90 | 0 | 0 | |
| 2 | BCDWY | 101 | 89 | 0 | 0 | |
| 3 | CDEFXY | 102 | 75 | 0 | 0 | |
| 4 | ABEWX | ... | ... | | | |
| 5 | BEDWX | ... | ... | | | |
| 6 | DEFVX | ... | ... | | | |

FIG.5

· EXTRACTED FROM FIVE-MINUTE TIME WINDOW AROUND "Y"

| A, B, Y | B, C, Y | A, C, Y |

· EXTRACTED FROM FIVE-MINUTE TIME WINDOW AROUND "Z"

| A, B, Z | A, P, Z |

· EXTRACTED FROM FIVE-MINUTE TIME WINDOW AROUND "Q"

| C, Q, P | P, Q, B |

FIG.6

· MESSAGES OCCURRING AROUND "Y": TWICE OF "A",
TWICE OF "B", AND TWICE OF "C"

y=(2, 2, 2, 0, 0, 0, 0, 0, 0, 0, 0, 0, 0, 0, 0, 0, 0, 0, 0, 0, 0, 0, 0, 0, 0, 0)

· MESSAGES OCCURRING AROUND "Z": TWICE OF "A",
ONCE OF "B", AND ONCE OF "P"

z=(2, 1, 0, 0, 0, 0, 0, 0, 0, 0, 0, 0, 0, 0, 0, 1, 0, 0, 0, 0, 0, 0, 0, 0, 0, 0)

· MESSAGES OCCURRING AROUND "Q": ONCE OF "B",
ONCE OF "C", AND TWICE OF "P"

| NO. | PATTERN | NUMBER OF OCCURRENCES (ACTUAL MEASUREMENT) | NUMBER OF FAILURES (ACTUAL MEASUREMENT) | NUMBER OF OCCURRENCES (COPY) | NUMBER OF FAILURES (COPY) | FORMER NO. | |
|---|---|---|---|---|---|---|---|
| 1 | ABCXY | 100 | 90 | 0 | 0 | | FORMER PATTERN |
| 2 | BCDWY | 101 | 89 | 0 | 0 | | |
| 3 | CDEFXY | 102 | 75 | 0 | 0 | | |
| 4 | ABEWX | ... | ... | | | | |
| 5 | BEDWX | ... | ... | | | | |
| 6 | DEFVX | ... | ... | | | | |
| 7 | ABCXZ | 1 | 1 | 100 | 90 | 1 | REGISTERED PATTERN |
| 8 | BCDWZ | 0 | 0 | 101 | 89 | 2 | |
| 9 | CDEFXZ | 0 | 0 | 102 | 75 | 3 | |

| NO. | PATTERN | NUMBER OF OCCUR- RENCES (ACTUAL MEASURE- MENT) | NUMBER OF FAILURES (ACTUAL MEASURE- MENT) | NUMBER OF OCCUR- RENCES (COPY) | NUMBER OF FAILURES (COPY) | FORMER NO. |
|---|---|---|---|---|---|---|
| 1 | ABCXY | 100 | 90 | 0 | 0 | |
| 2 | BCDWY | 101 | 89 | 0 | 0 | |
| 3 | CDEFXY | 102 | 75 | 0 | 0 | |
| 7 | ABCXZ | 1 | 1 | 100 | 90 | 1 |
| 8 | BCDWZ | 0 | 0 | 101 | 89 | 2 |
| 9 | CDEFXZ | 0 | 0 | 102 | 75 | 3 |
| 10 | ABGXZ | 1 | 1 | 100 | 90 | 7 |
| 11 | BGDWZ | 0 | 0 | 101 | 89 | 8 |
| 12 | GDEFXZ | 0 | 0 | 102 | 75 | 9 |
| 13 | ABGXY | 0 | 0 | 100 | 90 | 1 |
| 14 | BGDWY | 0 | 0 | 101 | 89 | 2 |
| 15 | GDEFXY | 0 | 0 | 102 | 75 | 3 |

PATTERNS REGISTERED FIRSTLY

PATTERNS REGISTERED SECONDLY 13, 14, AND 15 FROM 1, 2, AND 3 10, 11, AND 12 FROM 7, 8, AND 9

A, B, C, X, AND Z ARE DETECTED

FIG.10

To: System Admin
From: System Monitor
Date: 2012/03/14 12:13

FAILURE TYPE: WEB SERVER STOPPAGE
PREDICTED TIME: 12:25 TO 12:35
PROBABILITY OF OCCURRENCE: 90% [ESTIMATED PROBABILITY]

FIG.11

| NO. | PATTERN | NUMBER OF OCCUR-RENCES (ACTUAL MEASURE-MENT) | NUMBER OF FAILURES (ACTUAL MEASURE-MENT) | NUMBER OF OCCUR-RENCES (COPY) | NUMBER OF FAILURES (COPY) | FORMER NO. |
|---|---|---|---|---|---|---|
| 1 | ABCXY | 100 | 90 | 0 | 0 | |
| 2 | BCDWY | 101 | 89 | 0 | 0 | |
| 3 | CDEFXY | 102 | 75 | 0 | 0 | |
| 4 | ABEWX | ... | ... | | | |
| 5 | BEDWX | ... | ... | | | |
| 6 | DEFVX | ... | ... | | | |
| 7 | ABCXZ | 5 | 4 | 100 | 90 | 1 |
| 8 | BCDWZ | 0 | 0 | 101 | 89 | 2 |
| 9 | CDEFXZ | 0 | 0 | 102 | 75 | 3 |

FIG.12

| NO. | PATTERN | NUMBER OF OCCUR-RENCES (ACTUAL MEASURE-MENT) | NUMBER OF FAILURES (ACTUAL MEASURE-MENT) | NUMBER OF OCCUR-RENCES (COPY) | NUMBER OF FAILURES (COPY) | FORMER NO. |
|---|---|---|---|---|---|---|
| 1 | ABCXY | 100 | 90 | 0 | 0 | |
| 2 | BCDWY | 101 | 89 | 0 | 0 | |
| 3 | CDEFXY | 102 | 75 | 0 | 0 | |
| 4 | ABEWX | ... | ... | | | |
| 5 | BEDWX | ... | ... | | | |
| 6 | DEFVX | ... | ... | | | |
| 7 | ABCXZ | 5 | 0 | 100 | 90 | 1 |
| 8 | BCDWZ | 0 | 0 | 101 | 89 | 2 |
| 9 | CDEFXZ | 0 | 0 | 102 | 75 | 3 |

Rows 7–9: DELETED

FAILURE DETECTING APPARATUS AND FAILURE DETECTING METHOD USING PATTERNS INDICATING OCCURRENCES OF FAILURES

CROSS-REFERENCE TO RELATED APPLICATIONS

This application is a continuation of International Application No. PCT/JP2012/070271, filed on Aug. 8, 2012, the entire contents of which are incorporated herein by reference.

FIELD

The embodiments discussed herein are directed to a failure detecting apparatus, a failure detecting program, and a failure detecting method.

BACKGROUND

Techniques for detecting statuses of computers based on messages output from the computers have been known (see, for example, Japanese Laid-open Patent Publication No. 2008-225912). For example, when a failure occurs in a computer, a particular combination of messages may be output. A managing apparatus monitors whether or not messages output from a computer to be monitored include a pattern of messages indicating an occurrence of a failure to detect the occurrence of the failure. This pattern is a combination of messages that occur when the failure occurs and is stored in the managing apparatus in advance.

The messages output by the computer may be changed by a change in configuration, for example, by a software version upgrade. If the messages output from the computer are changed as mentioned, the managing apparatus is unable to recognize the change in the messages. Therefore, the managing apparatus is unable to detect the occurrence of the failure from the changed messages.

SUMMARY

According to an aspect of an embodiment, a failure detecting apparatus includes: a processor that executes a process including: identifying, when a new message is output from a target to be monitored, a message to be replaced, which is output from the target to be monitored before the output of the new message and is not output from the target to be monitored after the output of the new message; extracting a pattern including the message to be replaced, from patterns of messages stored in a storage unit, the patterns indicating occurrences of failures, and registering, in the storage unit, a pattern resulting from substitution of the message to be replaced included in the extracted pattern with the new message; and detecting whether or not messages output from the target to be monitored include any of the patterns stored in the storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a data configuration of a pattern table;

FIG. 5 is a diagram illustrating an example of messages occurring in five minutes around an occurrence of each of messages "Q", "Y", and "Z";

FIG. 6 is a diagram illustrating an example of vectors "q", "y", and "z";

FIG. 7 is a diagram illustrating an example of registering a new pattern in the pattern table;

FIG. 10 is a diagram illustrating an example of a notification;

FIG. 11 is a diagram illustrating an example of deleting data from the pattern table;

FIG. 12 is a diagram illustrating another example of deleting data from the pattern table;

DESCRIPTION OF EMBODIMENTS

Preferred embodiments of the present invention will be explained with reference to accompanying drawings. The respective embodiments may be combined with one another as appropriate, so long as no contradiction arises in the processed contents.

[a] First Embodiment

A first embodiment will be described. In the first embodiment, a case, where a managing apparatus, which monitors messages output from each device in a network system, is used as an example of a failure detecting apparatus, will be described.

Figure 1:
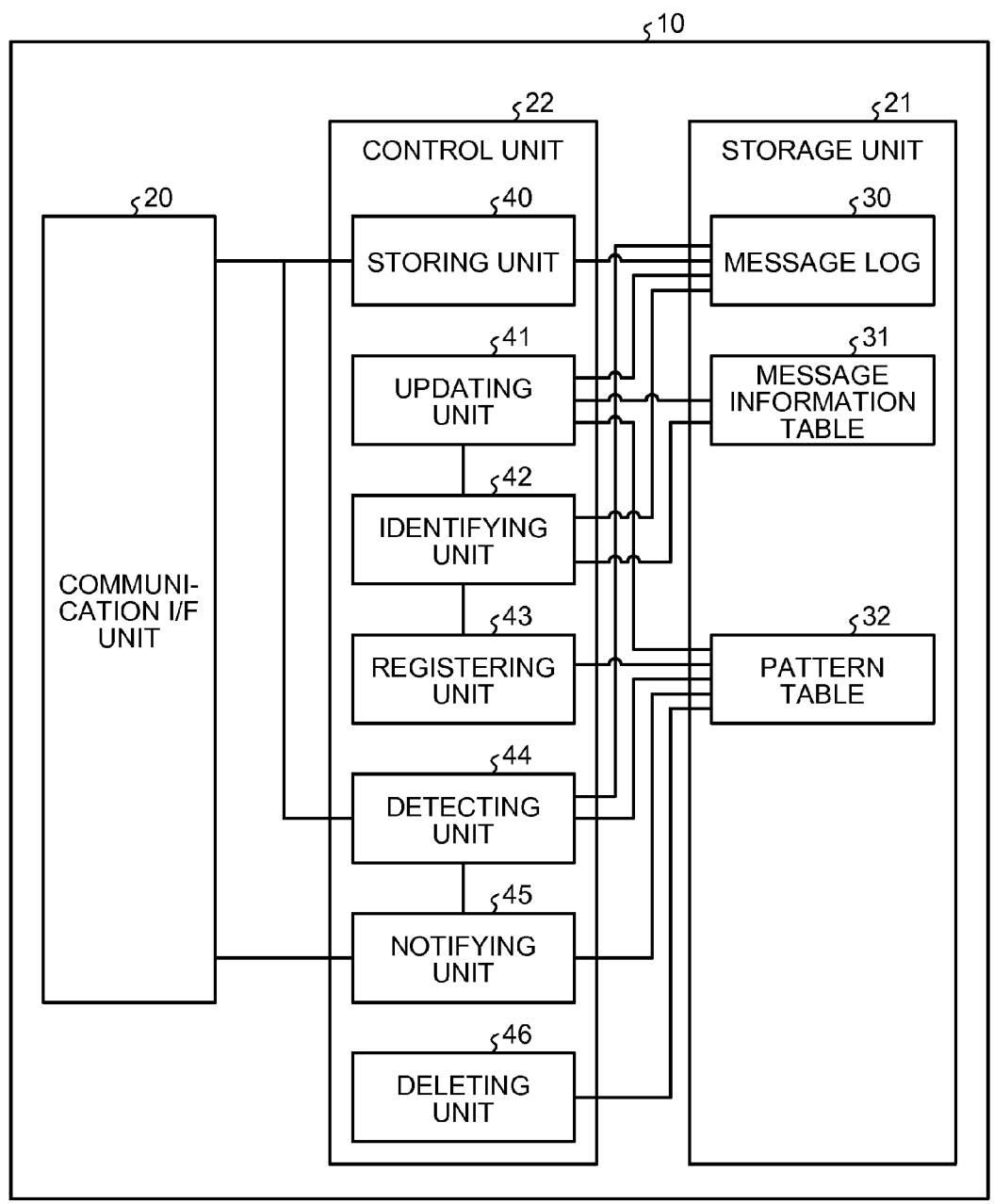
FIG. 1 is a diagram illustrating an example of a functional configuration of a managing apparatus.

FIG. 1 is a diagram illustrating an example of a functional configuration of the managing apparatus. As illustrated in FIG. 1, a managing apparatus 10 has a communication interface (I/F) unit 20, a storage unit 21, and a control unit 22.

The communication I/F unit 20 is an interface that controls communication with another device via a data transmission path, such as a network, which is not illustrated in the figure. To the network, another device, for example, a device to be monitored by the managing apparatus 10, is communicatably connected. The device to be monitored outputs, to the managing apparatus 10, various messages related to processes that have been executed. For example, the device to be monitored outputs, when an abnormality occurs in an application or the like, a message related to the abnormality. The communication I/F unit 20 receives, via the network, the messages from the device to be monitored. As the communication I/F unit 20, a network interface card, such as a LAN card, may be used.

The storage unit 21 is a storage device, which may be: a semiconductor memory element, such as a flash memory; a hard disk; an optical disk; or the like. The storage unit 21 is not limited to the storage device of the above type, and may be a random access memory (RAM), or a read only memory (ROM).

The storage unit 21 stores therein an operating system (OS) executed by the control unit 22 and various programs used in detection of a failure in the device to be monitored. Further, the storage unit 21 stores therein various data used in the programs executed by the control unit 22. For example, the storage unit 21 stores therein a message log 30, a message information table 31, and a pattern table 32.

The message log 30 is data storing therein messages received from the device to be monitored. For example, in the message log 30, the messages transmitted from the device to be monitored and received by the communication I/F unit 20 are stored by a later described storing unit 40 in the received order. In another example, the message log 30 is referred to by later described updating unit 41 and identifying unit 42, for detection of a failure.

Figures 2, 3:
FIG. 2 is a diagram schematically illustrating a configuration of a message log.
FIG. 3 is a diagram illustrating an example of a data configuration of a message information table.

FIG. 2 is a diagram schematically illustrating a configuration of the message log. The horizontal axis in FIG. 2 represents passage of time and respective numerical values indicate time. In the example of FIG. 2, the various messages stored are represented respectively by upper case alphabets. For example, the example of FIG. 2 illustrates that messages, "Y", "B", "P", "C", . . . , have been received over time.

The message information table 31 is a table storing therein various information related to the messages that have occurred. For example, in the message information table 31, data are registered and updated by the later described updating unit 41. In another example, the message information table 31 is referred to by the later described identifying unit 42 for identification of a new message that has newly occurred.

FIG. 3 is a diagram illustrating an example of a data configuration of the message information table. As illustrated in FIG. 3, the message information table 31 has therein respective items, which are "Message", "Time of Start of Occurrence", "Time of Last Occurrence", and "Average Occurrence Interval". The item, "Message", is an area storing therein identification information identifying a message. This identification information may be data of the message themselves or information uniquely identifying the message by a number, letters, or the like. The item, "Time of Start of Occurrence", is an area storing therein a time at which the message started occurring. The item, "Time of Last Occurrence", is an area storing therein a time at which the message last occurred. The item, "Average Occurrence Interval", is an area storing therein an average interval of occurrences of the message.

The example of FIG. 3 illustrates that a message, "Q", started occurring four hours ago, occurred last four hours ago, and has an average occurrence interval of four hours. Further, the example illustrates that a message, "Z", started occurring twelve hours ago, occurred last six hours ago, and has an average occurrence interval of eight hours.

The pattern table 32 is a table storing therein a pattern of messages, the pattern indicating an occurrence of a failure. In the pattern table 32, a pattern of messages, which occur when a failure occurs, is registered from a log or the like of past occurrences of failures. For example, in the pattern table 32, the number of occurrences and the number of failures are updated by the later described updating unit 41. In another example, the pattern table 32 is referred to and updated by the later described registering unit 43 when a pattern is generated. In yet another example, the pattern table 32 is referred to by a later described detecting unit 44 when a pattern is detected.

FIG. 4 is a diagram illustrating an example of a data configuration of the pattern table. As illustrated in FIG. 4, the pattern table 32 has respective items, which are "No.", "Pattern", "Number of Occurrences (Actual Measurement)", "Number of Failures (Actual Measurement)", "Number of Occurrences (Copy)", "Number of Failures (Copy)", and "Former No.". The item, "No.", is an area for storing identification information identifying a pattern. To the patterns, identification numbers respectively identifying the patterns are given. In the item, "No.", the identification numbers given to the patterns are stored. The item, "Pattern", is an area storing therein a combination of messages regarded as a pattern. In the item, "Pattern", information indicating a combination of messages that occur when a failure occurs is stored, from the log or the like of the past occurrences of failures. The item, "Number of Occurrences (Actual Measurement)", is an area storing therein the number of times the messages of the pattern have occurred. The item, "Number of Failures (Actual Measurement)", is an area storing therein the number of times the failure has occurred upon occurrence of the messages of the pattern. The item, "Number of Occurrences (Copy)", is an area for storing therein the number of times a former pattern before substitution has occurred when a pattern substituted with a new message is registered by the later described registering unit 43. The item, "Number of Failures (Copy)", is an area storing therein the number of failures for the former pattern before the substitution when the pattern substituted with the new message is registered by the later described registering unit 43. The item, "Former No.", is an area storing therein an identification number of the former pattern before the substitution. If a former pattern before substitution exists, an identification number of the former pattern before the substitution is stored in the item, "Former No.", which is blank if no former pattern before substitution exists.

The example of FIG. 4 illustrates that the pattern numbered "1" is a combination of messages, "A", "B", "C", "X", and "Y". Further, the example illustrates that for the pattern numbered "1", the actually measured number of occurrences is "100", the actually measured number of failures is "90", the copied number of occurrences is "0", and the copied number of failures is "0". Furthermore, the example illustrates, for the pattern numbered "1", that the item, "Former No.", is blank and that no former pattern before substitution exists.

Returning to FIG. 1, the control unit 22 has an internal memory for storing therein programs and control data, which prescribe various procedures, and the control unit 22 executes various processes by them. The control unit 22 is: an integrated circuit, such as an application specific integrated circuit (ASIC) or a field programmable gate array (FPGA); or an electronic circuit, such as a central processing unit (CPU) or a micro processing unit (MPU). The control unit 22 functions as various processing units by operations of the various programs. For example, the control unit 22 has the storing unit 40, the updating unit 41, the identifying unit 42, the registering unit 43, the detecting unit 44, a notifying unit 45, and a deleting unit 46.

The storing unit 40 is a processing unit that stores various data in the storage unit 21. The storing unit 40 stores received messages in the message log 30. For example, the storing unit 40 receives the messages received by the communication I/F unit 20 and collects the received messages. The storing unit 40 then adds and stores, as a generation history of messages, the collected messages and their received dates and times in association with each other, into the message log 30.

The updating unit 41 is a processing unit that updates various data. The updating unit 41 updates the pattern table 32. For example, the updating unit 41 sequentially reads messages from the message log 30 at predetermined timings. If any of the patterns that have been registered in the pattern table 32 occurs in the message log 30, the updating unit 41 then counts up the value of "Number of Occurrences (Actual Measurement)" of the pattern that has occurred in the pattern table 32. Further, if a failure had occurred at the date and time at which any of the patterns occurred, the updating unit 41 counts up the value of "Number of Failures (Actual Measurement)" of the pattern that has occurred in the pattern table 32. The predetermined timings may be at predetermined intervals like daily or monthly timings, or at timings when an administrator or the like instructs updating. Further, whether or not a failure had occurred at a date and time when the messages of the pattern were recorded may be determined from the messages stored in the message log 30. Further, whether or not a failure had occurred at a date and time when the messages of the pattern were recorded may be determined from separate data by storing, as the separate data, a time period during which the failure was occurring in the device to be monitored.

Further, the updating unit 41 updates the message information table 31. For example, the updating unit 41 finds, based on a received date and time of each message stored in the message log 30, the time of start of occurrence, the time of last occurrence, and the average occurrence interval for each type of the messages. For a message already registered in the message information table 31, the updating unit 41 updates "Time of Last Occurrence" and "Average Occurrence Interval" of that message. Further, for a message not registered in the message information table 31 yet, the updating unit 41 registers "Time of Start of Occurrence", "Time of Last Occurrence", and "Average Occurrence Interval" of that message.

The identifying unit 42 is a processing unit that performs various identifications. The identifying unit 42 identifies, based on "Time of Start of Occurrence" stored in the message information table 31, a new message that has newly occurred. For example, the identifying unit 42 identifies a message, which started occurring at a date and time that is within a predetermined time period from the present, as a new message. Or, the identifying unit 42 identifies a message, which has started occurring at a date and time that is at or after a date and time at which the message information table 31 was last updated, as a new message.

If a new message has been identified, the identifying unit 42 identifies a message to be replaced, which had been output from the target to be monitored before the output of the new message and has not been output from the target to be monitored since the output of the new message. For example, the identifying unit 42 identifies a message to be replaced, based on an average occurrence interval and a time period from the last occurrence for each message. For example, the identifying unit 42 identifies, as a message to be replaced, a message, which has last occurred before the occurrence of the new message and for which a time period from the last occurrence is equal to or greater than a predetermined multiple of its average occurrence interval. This predetermined multiple may be any multiple as long as the multiple is greater than the average occurrence interval multiplied by one. For the predetermined multiple, the greater the multiplier is, the more accurately the message no longer occurring will be able to be identified, but the longer the time period taken for the message no longer occurring to be identifiable will be. The predetermined multiple may be variable. If the variance of the occurrence interval of the message is large, the multiplier may be increased and if the variance is small, the multiplier may be decreased. In this embodiment, the predetermined multiple may be, for example, twice the average occurrence interval.

The identifying unit 42 identifies, based on the message log 30, for the message to be replaced and the new message, other messages that occur around their occurrences, respectively. For example, the identifying unit 42 identifies, for each of the message to be replaced and the new message, messages that occur during a predetermined period around its occurrence. This predetermined period may be determined according to a period during which the respective messages of the pattern stored in the pattern table 32 are output. For example, if respective messages of a particular pattern indicating an occurrence of a failure are output in five minutes when a failure occurs, the predetermined period is set to five minutes. In this embodiment, the predetermined period is, for example, five minutes.

The identifying unit 42 then finds a similarity between the messages that occur around the occurrence of the message to be replaced and the messages that occur around the occurrence of the new message, and identifies the message to be replaced having a high similarity.

For example, for the case of the states illustrated in FIG. 2 and FIG. 3, the identifying unit 42 identifies the messages, "Q" and "Z", as new messages. Further, the identifying unit 42 identifies the message, "Y", as a message to be replaced, because the message, "Y", occurred before the occurrences of the new messages, "Q" and "Z", and the period from its last occurrence is equal to or greater than twice its average occurrence interval.

In this embodiment, since two new messages, which are the messages, "Q" and "Z", are available, two cases, which are a case where the message, "Y", has changed to the message, "Q", and a case where the message, "Y", has changed to the message, "Z", are possible.

The identifying unit 42 identifies, based on the message log 30, messages that occur during the five minutes around the occurrence of each of the messages, "Q", "Y", and "Z". FIG. 5 is a diagram illustrating an example of the messages occurring in the five minutes around the occurrence of each of the messages, "Q", "Y", and "Z". The example of FIG. 5 illustrates that the messages output around the message, "Y", are [A, B, Y], [B, C, Y], and [A, C, Y]. Further, the example illustrates that the messages output around the message, "Z", are [A, B, Z] and [A, P, Z]. Furthermore, the example illustrates that the messages output around the message, "Q", are [C, Q, P] and [P, Q, B].

The identifying unit 42 counts the number of occurrences of each of the other messages output therearound, for each of the messages, "Q", "Y", and "Z". For the messages, "Q", "Y", and "Z", the identifying unit 42 then finds a similarity between the message to be replaced and the new message by using a calculation method of regarding the numbers of occurrences of the respective messages as elements of a vector and finding a similarity between vectors.

For example, if 26 types, "A" to "Z", of messages occur, the identifying unit 42 associates the messages, "A" to "Z", with the elements (A, B, C, . . . , Z) of the vector and as illustrated in FIG. 6, finds vectors, "q", "y", and "z", having the number of occurrences of each message as a value of an element thereof. FIG. 6 is a diagram illustrating an example of the vectors, "q", "y", and "z". As illustrated in FIG. 6, around the message, "Y", the message, "A", occurs twice, the message, "B", occurs twice, and the message, "C", occurs twice. Thus, in the vector, "y", the values of the elements corresponding to the messages, "A", "B", and "C", are "2". Further, around the message, "Z", the message, "A", occurs twice, the message, "B", occurs once, and the message, "P", occurs once. Thus, in the vector "z", the value of the element corresponding to the message, "A", is "2", and the values of the elements corresponding to the messages, "B" and "P", are "1". Further, around the message "Q", the message, "B", occurs once, the message, "C", occurs once, and the message, "P", occurs twice. Thus, in the vector, "q", the values of the elements corresponding to the messages, "B" and "C", are "1" and the value of the element corresponding to the message, "P", is "2".

The identifying unit 42 finds a similarity between the message, "Y", and message, "Q", and a similarity between the message, "Y", and message, "Z", by using calculation of finding a similarity (x, y) between a vector, "x", and a vector, "y", which is expressed by the following Equation (1).

$$\text{Similarity } (x,y) = x \cdot y / (|x| \times |y|) \quad (1)$$

For example, from Equation (1), a similarity (y, q) between the vector, "y", and vector, "q", is calculated as expressed by the following Equation (2). Thus, the similarity between the message, "Y", and the message, "Q", is found to be "0.4714".

$$\text{Similarity}(y, q) = \frac{4}{2\sqrt{3}\sqrt{6}} = \frac{2}{3\sqrt{2}} = 0.4714 \quad (2)$$

Similarly, from Equation (1), a similarity (y, z) between the vector, "y", and vector, "z", is calculated, as expressed by the following Equation (3). Thus the similarity between the message, "Y", and the message, "Z", is found to be "0.7071".

$$\text{Similarity}(y, z) = \frac{6}{2\sqrt{3}\sqrt{6}} = \frac{1}{\sqrt{2}} = 0.7071 \quad (3)$$

The identifying unit 42 identifies a combination of messages having a similarity greater than a predetermined threshold value and having the greatest similarity. This threshold value may be set at an appropriate value at which the message is regarded as having changed. In this embodiment, the threshold value is, for example, "0.5".

The identifying unit 42 then determines that messages have changed between the messages of the identified combination. For example, the similarity between the message, "Y", and the message, "Z", is larger than the similarity between the message, "Y", and the message, "Q", and the similarity is larger than "0.5". Thus, the identifying unit 42 identifies the message to be replaced with the new message, "Y", to be the message, "Z". If the greatest similarity is equal to or less than the threshold value, the identifying unit 42 identifies the replacement target to be none.

Returning to FIG. 1, the registering unit 43 is a processing unit that performs registration of a new pattern. If a message to be replaced is identified by the identifying unit 42, the registering unit 43 extracts, from the pattern table 32, a pattern including the message to be replaced identified by the identifying unit 42. The registering unit 43 then generates a pattern resulting from substitution of the message to be replaced included in the extracted pattern with the new message. The registering unit 43 registers the generated pattern in the pattern table 32. When registering the generated pattern in the pattern table 32, the registering unit 43 stores, in the item, "Former No.", the value in the item, "No.", of the pattern that is a former of the registered pattern.

Further, if the extracted pattern does not include any other new message, the registering unit 43 respectively copies the values of "Number of Occurrences (Actual Measurement)" and "Number of Failures (Actual Measurement)" of the extracted pattern into "Number of Occurrences (Copy)" and "Number of Failures (Copy)" of the pattern to be registered. On the contrary, if the extracted pattern includes another new message, the registering unit 43 respectively copies the values of "Number of Occurrences (Copy)" and "Number of Failures (Copy)" of the extracted pattern into "Number of Occurrences (Copy)" and "Number of Failures (Copy)" of the pattern to be registered.

FIG. 7 is a diagram illustrating an example of registering a new pattern in the pattern table. The example of FIG. 7 illustrates a case where the message to be replaced with the new message, "Z", has been identified to be the message, "Y". In the example of FIG. 7, patterns numbered "7" to "9", resulting from substitution of the message, "Y", included in the patterns numbered "1" to "3" with the message, "Z", are registered in the pattern table 32. Further, the patterns numbered "1" to "3" do not include any other new message. Thus, in the example of FIG. 7, the values of "Number of Occurrences (Actual Measurement)" and "Number of Failures (Actual Measurement)" of the patterns numbered "1" to "3" are copied into "Numbers of Occurrences (Copy)" and "Numbers of Failures (Copy") of the patterns numbered "7" to "9".

Figures 8, 9:
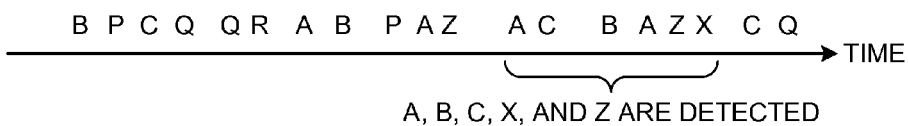
FIG. 8 is a diagram illustrating another example of registering a new pattern in the pattern table.
FIG. 9 is a diagram illustrating an example of a case where messages have changed.

FIG. 8 is a diagram illustrating another example of registering a new pattern in the pattern table. The example of FIG. 8 illustrates a case where the message to be replaced with the new message, "Z", has been identified to be the message, "Y", and a message to be replaced with a new message, "G", has been identified to be the message, "C". In the example of FIG. 8, similarly to FIG. 7, the patterns numbered "7" to "9", resulting from substitution of the message, "Y", included in the patterns numbered "1" to "3" with the message, "Z", are registered in the pattern table 32. Further, in the example of FIG. 8, patterns numbered "10" to "15", resulting from substitution of the message, "C", included in the patterns numbered "1" to "3" and "7" to "9" with the message, "G", are registered in the pattern table 32. The patterns numbered "7" to "9" include the message, "Z", which is another new message. Thus, in the example of FIG. 8, the values in "Number of Occurrences (Copy)" and "Number of Failures (Copy)" of the patterns numbered "7" to "9" are respectively copied into "Number of Occurrences (Copy)" and "Number of Failures (Copy)" of the patterns numbered "10" to "12". However, the patterns numbered "1" to "3" do not include any other new message. Thus, in the example of FIG. 8, the values in "Number of Occurrences (Copy)" and "Number of Failures (Copy)" of the patterns numbered "1" to "3" are respectively copied into "Number of Occurrences (Copy)" and "Number of Failures (Copy)" of the patterns numbered "13" to "15".

Returning to FIG. 1, the detecting unit 44 is a processing unit that detects a pattern from received messages. The detecting unit 44 detects whether or not the received messages include any of the patterns stored in the pattern table 32. For example, when a message is received, the detecting unit 44 extracts messages that have been generated within a predetermined period from the present time point, from the message log 30. This predetermined period may be determined, as described above, according to a period during which the respective messages of a pattern stored in the pattern table 32 are output. In this embodiment, the predetermined period is, for example, five minutes.

The detecting unit 44 then sequentially reads the patterns stored in the pattern table 32 and determines whether or not all of the messages of the read pattern are included in the messages generated within the predetermined period. The order of messages output from a target to be monitored sometimes changes depending on the order in which the messages are processed in the target to be monitored. Thus, the detecting unit 44 determines whether or not all of the messages of the pattern have been received in the predetermined period by determining whether or not all of the messages of the pattern are included in the received messages and extracted messages, without assessing the order of the messages.

For example, even if a message output from a target to be monitored is changed by a change in a configuration of the target to be monitored, a pattern including the changed message is registered in the pattern table 32. As a result, the managing apparatus 10 is able to detect an occurrence of a failure even if a message output from a target to be monitored is changed.

FIG. 9 is a diagram illustrating an example of a case where a message has changed. The example of FIG. 9 illustrates a case where the message, "Y", output from a target to be monitored is changed to the message, "Z". In this case also, as illustrated in FIG. 7 and FIG. 8, a pattern including the messages "A", "B", "C", "X", and "Z" is registered and thus the detecting unit 44 is able to detect the pattern including the messages "A", "B", "C", "X", and "Z".

Returning to FIG. 1, the notifying unit 45 is a processing unit that performs various notifications. The notifying unit 45 performs a notification when any of the patterns is detected by the detecting unit 44 from the received messages. For example, the notifying unit 45 reads the item, "Source No.", of the detected pattern from the pattern table 32. The item, "Source No.", has a value stored therein if the detected pattern is a pattern, which has been subjected to substitution of messages, and is blank if the detected pattern is a pattern, which has not been subjected to substitution of messages. If the item, "Source No.", is blank, the notifying unit 45 respectively reads values of "Number of Occurrence (Actual Measurement)" and "Number of Failures (Actual Measurement)" of the detected pattern from the pattern table 32, and divides the number of failures by the number of occurrences to calculate a probability of occurrence of failure. On the contrary, if a numerical value is stored in the item, "Source No.", the notifying unit 45 reads "Number of Occurrence (Copy)" and "Number of Failures (Copy)" of the detected pattern from the pattern table 32, and divides the number of failures by the number of occurrences to calculate a probability of occurrence of failure. The notifying unit 45 then notifies the calculated probability of occurrence of failure to an administrator or the like.

FIG. 10 is a diagram illustrating an example of a notification. The example of FIG. 10 illustrates an example of performing notification by a mail to an administrator. In the example of FIG. 10, a probability of occurrence of failure is mentioned. Further, in the example of FIG. 10, a failure type indicating what type of failure occurs from the detected pattern and a predicted time at which the failure is predicted to occur are also mentioned. The failure type is able to be identified by, for example, registering in advance a failure type correspondingly with each pattern in the pattern table 32. Further, the predicted time is able to be identified by, for example, registering in advance how much later a failure occurs and an occurrence period of the failure, correspondingly with each pattern in the pattern table 32.

Returning to FIG. 1, the deleting unit 46 is a processing unit that deletes various data. For each pattern registered in the pattern table 32, if the actually measured number of occurrences thereof becomes equal to or greater than a predetermined number, the deleting unit 46 divides the actually measured number of failures by the actually measured number of occurrences to calculate an actually measured probability of occurrence of failure. Further, the deleting unit 46 divides the copied number of failures by the copied number of occurrences to calculate a copied probability of occurrence of failure. If the actually measured probability of occurrence of failure is less than the copied probability of occurrence of failure by a predetermined value or more, the deleting unit 46 deletes, from the pattern table 32, any pattern that has been subjected to substitution with the same message as the pattern with the copied probability of occurrence of failure less by the predetermined value or more. On the contrary, if the actually measured probability of occurrence of failure is not less than the copied probability of occurrence of failure by the predetermined value or more, the deleting unit 46 deletes values in the items, "Number of Occurrences (Copy)", "Number of Failures (Copy)", and "Source No." of the registered pattern. The above predetermined number may be determined according to an allowable error for a calculated probability of occurrence of failure. In this embodiment, the predetermined number is, for example, five [times]. Further, the above predetermined value may be set to an appropriate value allowing the failure occurrence probabilities to be regarded as being different. In this embodiment, the predetermined value is, for example, 20%.

FIG. 11 is a diagram illustrating an example of deleting data from the pattern table. In the example of FIG. 11, an actually measured probability of occurrence of failure of the pattern numbered "7" is "4/5=80%" and its copied probability of occurrence of failure is "90/100=90%". In this case, the deleting unit 46 deletes the values in the items, "Number of Occurrences (Copy)", "Number of Failures (Copy)", and "Source No." of the pattern numbered "7". As a result, the pattern numbered "7" is no longer regarded as a pattern rewritten and registered and becomes equivalent to a pattern that has been registered in advance.

FIG. 12 is a diagram illustrating another example of deleting data from the pattern table. In the example of FIG. 12, an actually measured probability of occurrence of failure of the pattern numbered "7" is "0/5=0%" and its copied probability of occurrence of failure is "90/100=90%". In this case, the deleting unit 46 deletes the patterns numbered "7" to "9" from the pattern table 32. As a result, notification of failures for the patterns numbered "7" to "9" will no longer be performed.

Figure 13:
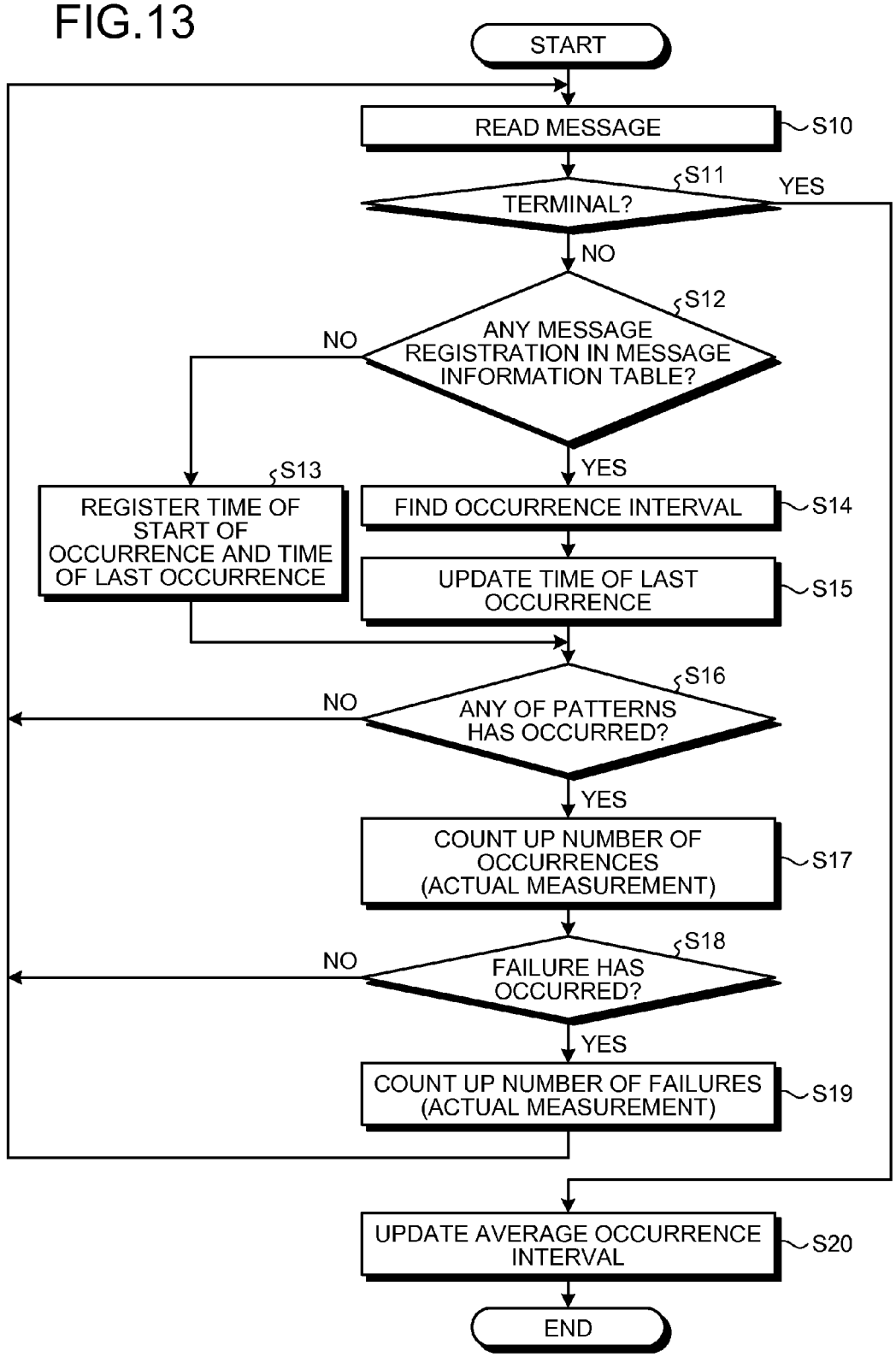
FIG. 13 is a flow chart illustrating a procedure of an updating process.

Next, a flow of an updating process of updating, based on the message log 30, the pattern table 32 and the message information table 31, by the managing apparatus 10 according to this embodiment, will be described. FIG. 13 is a flow chart illustrating a procedure of the updating process. This updating process is executed at predetermined timings, for example, at predetermined intervals, such as at certain dates and times.

As illustrated in FIG. 13, the updating unit 41 reads the messages from the message log 30 in order from that having the eldest receiving date and time (step S10). The updating unit 41 determines, as a result of the reading, whether or not the terminal of the message log 30 has been reached (step S11).

If the terminal of the message log 30 has not been reached (step S11: No), the updating unit 41 determines whether or not a read message has been registered in the message information table 31 (step S12). If not registered in the message information table 31 (step S12: No), the updating unit 41 registers the read message in the message information table 31 by setting the received date and time of the read message in the items, "Time of Start of Occurrence" and "Time of Last Occurrence" (step S13). On the contrary, if registered in the message information table 31 (step S12: Yes), the updating unit 41 finds an occurrence interval from the time of last occurrence of the read message stored in the message information table 31 and the received date and time of the read message (step S14). The updating unit 41 then updates the time of last occurrence of the read message in the message information table 31 to the received date and time (step S15).

The updating unit 41 determines whether or not any of the patterns registered in the pattern table 32 has occurred in the messages received in the predetermined period including the read message (step S16). If any of the patterns has occurred (step S16: Yes), the updating unit 41 increments the value of "Number of Occurrences (Actual Measurement)" of the occurring pattern stored in the pattern table 32, by one (step S17). The updating unit 41 then determines whether or not a failure was occurring at the date and time when the pattern occurred (step S18). If a failure was occurring (step S18: Yes), the updating unit 41 increments the value of "Number of Failures (Actual Measurement)" of the occurring pattern stored in the pattern table 32 by one (step S19), and proceeds to above described step S10.

On the contrary, if none of the patterns has occurred (step S16: No) and a failure has not occurred (step S18: No), above described step S10 is performed.

If the terminal of the message log 30 has been reached (step S11: Yes), an average occurrence interval for each message is found, the average occurrence interval of each message in the message information table 31 is updated (step S20), and the process is ended.

Figure 14:
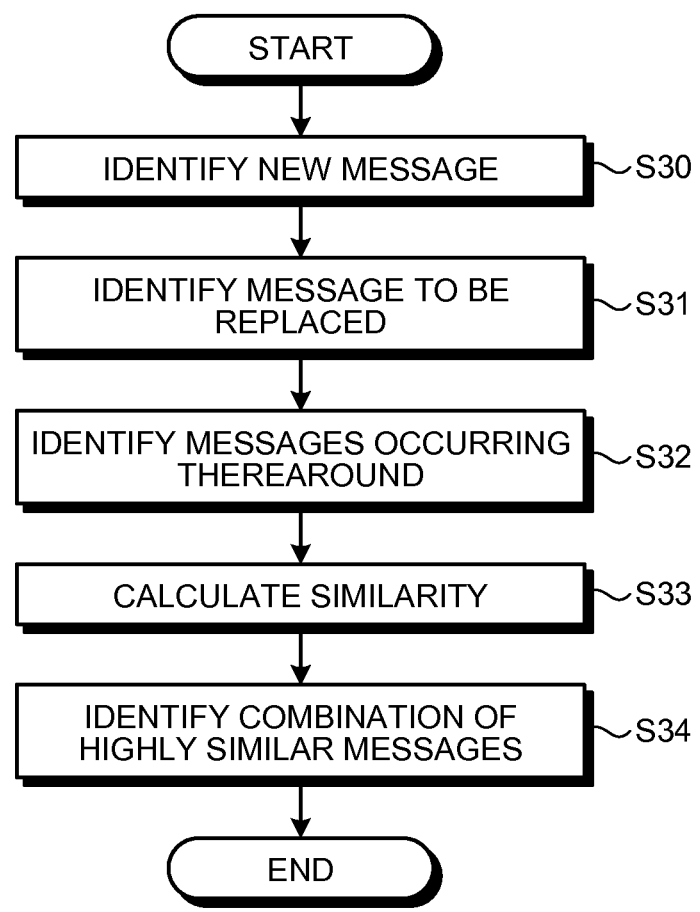
FIG. 14 is a flow chart illustrating a procedure of an identifying process.

Next, a flow of an identifying process of identifying a new message and a message to be replaced, by the managing apparatus 10 according to this embodiment, will be described. FIG. 14 is a flow chart illustrating a procedure of the identifying process. This identifying process is executed at a predetermined timing, for example, at a timing at which the above described updating process is ended.

As illustrated in FIG. 14, the identifying unit 42 identifies, based on "Time of Start of Occurrence" stored in the message information table 31, a new message that has newly occurred (step S30). The identifying unit 42 then identifies a message to be replaced, which had been output from a target to be monitored before the output of the new message and has not been output from the target to be monitored since the output of the new message (step S31).

The identifying unit 42 identifies other messages that occur around each of the message to be replaced and the new message (step S32). By respectively regarding the message to be replaced and the new message as vectors, the identifying unit 42 then finds a similarity therebetween (step S33). The identifying unit 42 then identifies, based on the found similarity, a combination of the new message for replacement and the message to be replaced (step S34), and ends the process.

Figure 15:
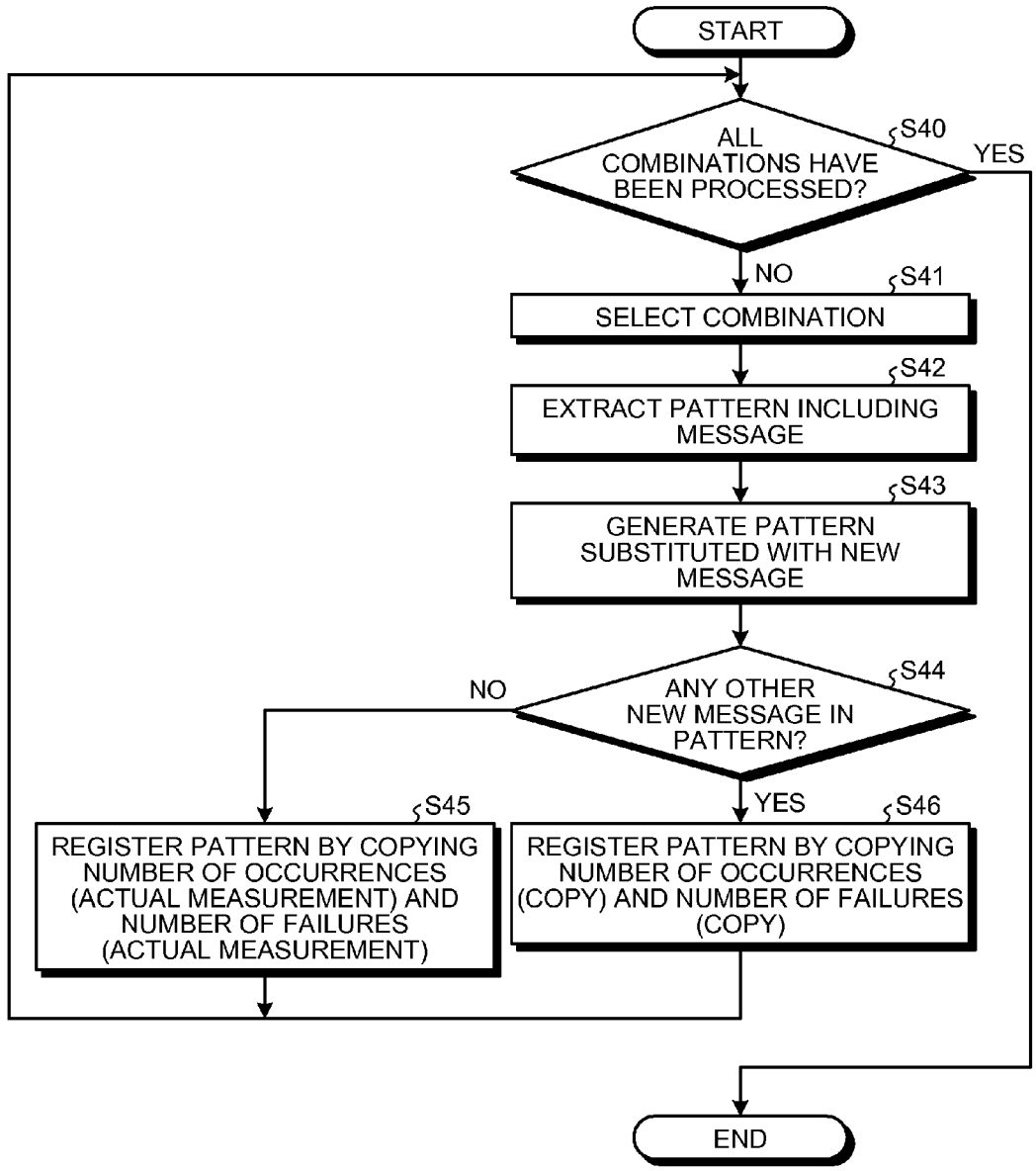
FIG. 15 is a flow chart illustrating a procedure of a registering process.

Next, a flow of a registering process of registering a new pattern in the pattern table 32, by the managing apparatus 10 according to this embodiment, will be described. FIG. 15 is a flow chart illustrating a procedure of the registering process. This registering process is executed at a predetermined timing, for example, at a timing at which the above described identifying process is ended.

As illustrated in FIG. 15, the registering unit 43 determines whether or not all of the combinations identified by the identifying process have been processed (step S40). If all of the combinations have been processed (step S40: Yes), the process is ended.

On the contrary, if all of the combinations have not been processed (step S40: No), the registering unit 43 selects any of combinations that have not been selected yet (step S41). The registering unit 43 extracts any pattern, which includes the message to be replaced of the selected combination, from the pattern table 32 (step S42). The registering unit 43 then generates a pattern resulting from substitution of the message to be replaced included in the extracted pattern with the new message (step S43).

The registering unit 43 determines whether or not the extracted pattern includes any other new message (step S44). If any other new message is not included (step S44: No), the registering unit 43 registers the pattern in the pattern table 32 by performing a process like the following (step S45) and proceeds to step S40. Specifically, the registering unit 43 copies the values of "Number of Occurrences (Actual Measurement)" and "Number of Failures (Actual Measurement)" of the extracted pattern into "Number of Occurrences (Copy)" and "Number of Failures (Copy)" and registers the generated pattern in the pattern table 32.

On the contrary, if another new message is included (step S44: Yes), the registering unit 43 registers the pattern in the pattern table 32 by performing a process like the following (step S46) and proceeds to step S40. Specifically, the registering unit 43 registers the generated pattern in the pattern table 32 by respectively copying the values of "Number of Occurrences (Copy)" and "Number of Failures (Copy)" of the extracted pattern.

Figure 16:
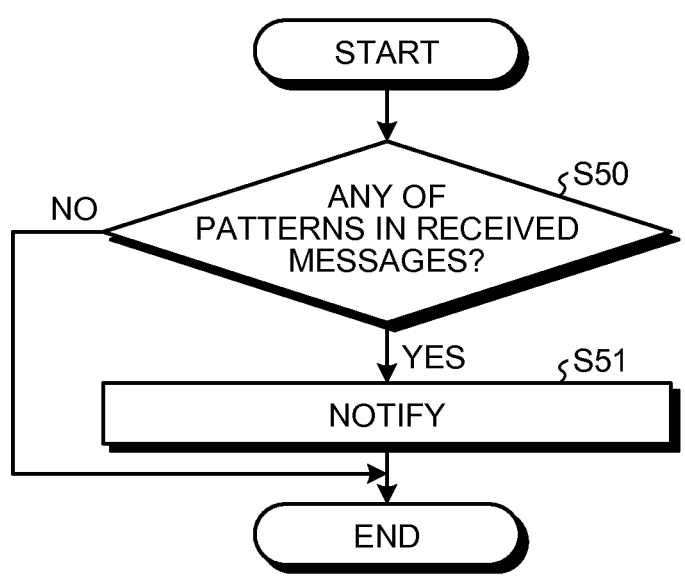
FIG. 16 is a flow chart illustrating a procedure of a detecting process.

Next, a flow of a detecting process of detecting a pattern from received messages, by the managing apparatus 10 according to this embodiment, will be described. FIG. 16 is a flow chart illustrating a procedure of the detecting process. This detecting process is executed at a timing at which messages have been received.

As illustrated in FIG. 16, the detecting unit 44 detects whether or not any of the patterns stored in the pattern table 32 is in the received messages (step S50). If the detecting unit 44 detects any of the patterns (step S50: Yes), the notifying unit 45 performs a notification (step S51) and the process is ended. On the contrary, if the detecting unit 44 does not detect any of the patterns (step S50: No), the process is ended.

Figure 17:
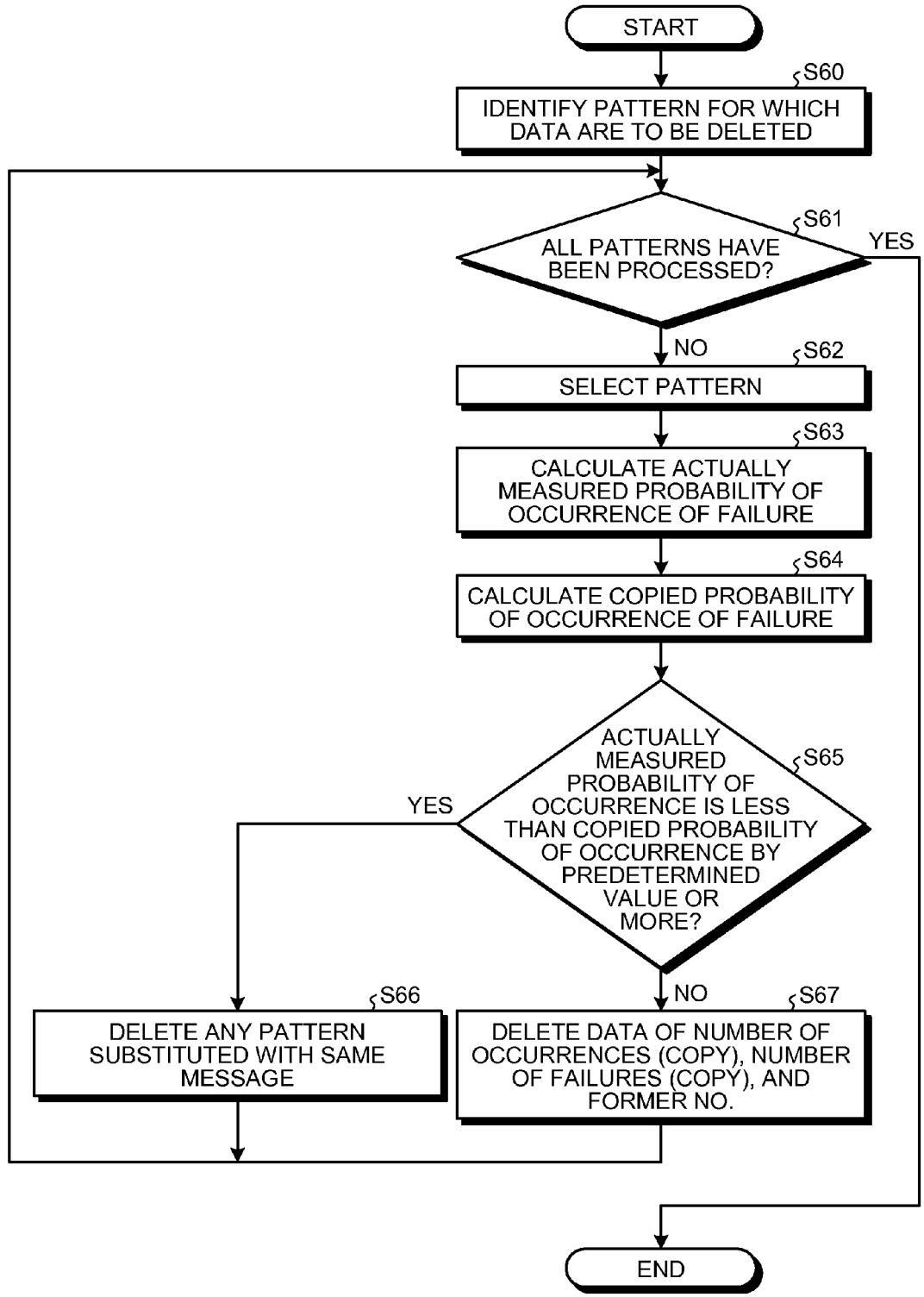
FIG. 17 is a flow chart illustrating a procedure of a deleting process.

Next, a flow of a deleting process of deleting data from the pattern table 32, by the managing apparatus 10 according to this embodiment, will be described. FIG. 17 is a flow chart illustrating a procedure of the deleting process. This detecting process is executed at predetermined timings, for example, at predetermined intervals, such as at certain dates and times.

As illustrated in FIG. 17, the deleting unit 46 identifies a pattern, which has been newly registered in the pattern table 32 and for which the actually measured number of occurrences has become equal to or greater than a predetermined number (step S60). The deleting unit 46 determines whether or not all of the identified patterns have been processed (step S61). If all of the patterns have been processed (step S61: Yes), the process is ended.

On the contrary, if all of the patterns have not been processed (step S61: No), the deleting unit 46 selects a pattern from the patterns that have not been processed yet (step S62). The deleting unit 46 calculates an actually measured probability of occurrence of failure by dividing the actually measured number of failures by the actually measured number of occurrences (step S63). Further, the deleting unit 46 calculates a copied probability of occurrence of failure by dividing the copied number of failures by the copied number of occurrences (step S64).

The deleting unit 46 determines whether or not the actually measured probability of occurrence of failure is less than the copied probability of occurrence of failure by a predetermined value or more (step S65). If less by the predetermined value or more (step S65: Yes), the deleting unit 46 deletes, from the pattern table 32, any pattern that has been subjected to substitution with the same message as the pattern having the copied probability of occurrence of failure that is less by the predetermined value or more (step S66) and proceeds to above described step S61.

On the contrary, if not less by the predetermined value or more (step S65: No), the deleting unit 46 deletes the values in the items, "Number of Occurrences (Copy)", "Number of Failures (Copy)", and "Source No." of the pattern (step S67) and proceeds to above described step S61.

As described, the managing apparatus 10 stores, in the storage unit 21, patterns of messages indicating occurrences of failures. Further, if a new message not available before is output from a target to be monitored, the managing apparatus 10 identifies a message to be replaced, which had been output from the target to be monitored before the output of the new message and has not been output from the target to be monitored since the output of the new message. The managing apparatus 10 extracts a pattern including the message to be replaced from the patterns stored in the storage unit 21 and registers, in the storage unit 21, a pattern resulting from substitution of the message to be replaced therein with the new message. The managing apparatus 10 then detects whether any pattern stored in the storage unit 21 is in messages output from the target to be monitored. As a result, the managing apparatus 10 is able to detect an occurrence of a failure even if a message output from a target to be monitored is changed.

Further, the managing apparatus 10 identifies a message to be replaced, based on an average occurrence interval of each message and a period from its last occurrence. As a result, the managing apparatus 10 is able to identify a message that no longer occurs, accurately.

Further, the managing apparatus 10 find a similarity between messages that occur in a predetermined period around an occurrence of a message to be replaced and messages that occur in a predetermined period around an occurrence of the new message, and identifies a message to be replaced with a high similarity. As a result, the managing apparatus 10 is able to identify a message that has been changed, accurately.

Further, the managing apparatus 10 stores, in the storage unit 21, the number of occurrences and number of failure occurrences for each pattern. The managing apparatus 10 copies the number of occurrences and the number of failure occurrences for the extracted pattern and registers the copied numbers correspondingly with the substituted pattern in the storage unit 21. The managing apparatus 10 then notifies a probability of occurrence of failure from the number of occurrences and the number of failure occurrences for the detected pattern. As a result, the managing apparatus 10 is able to notify the probability of occurrence even if a registered new pattern is detected and the number of occurrences and the number of failures for the new pattern have not been counted sufficiently.

Further, if the extracted pattern does not include any other new message, the managing apparatus 10 copies the number of occurrences and the number of failure occurrences for that pattern. Further, if the extracted pattern includes any other new message, the managing apparatus 10 further copies the number of occurrences and the number of failure occurrences that have been copied for the pattern. As a result, even if substitution of messages have occurred in a plurality of pairs, from the copied number of occurrences and number of failure occurrences, an appropriate probability of occurrence is able to be notified.

Further, if a probability of occurrence of failure for a pattern registered in the storage unit 21 is less than a probability of occurrence of failure for a pattern that is a former of the registered pattern by a predetermined value or more, the registered pattern is deleted from the storage unit 21. As a result, because a pattern with a small reliability is deleted, detection accuracy for an occurrence of a failure is improved in the managing apparatus 10.

[b] Second Embodiment

The embodiment related to the disclosed apparatus has been described, but the disclosed technique may be embodied in various different modes, other than the above described embodiment. Thus, hereinafter, other embodiments included in the present invention will be described.

In the above embodiment, a case where an occurrence of a failure is detected from messages notified from another device has been described, but the disclosed apparatus is not limited thereto. For example, the disclosed apparatus may be used in a case where an occurrence of a failure is detected from messages that occur in the apparatus itself.

Further, respective structural elements of each device are functionally and conceptually illustrated in the drawings and may be not physically configured as illustrated therein. That is, a specific state of separation and integration of the respective devices is not limited only to those illustrated in the drawings, and all or a part thereof may be configured by functional or physical separation or integration thereof in arbitrary units depending on various loads and use situations. For example, any of the respective processing units, which are the storing unit 40, the updating unit 41, the identifying unit 42, the registering unit 43, the detecting unit 44, the notifying unit 45, and the deleting unit 46, may be integrated with one another as appropriate. Further, all or any part of respective processing functions performed in each processing unit may be realized by a CPU and a program analyzed and executed by the CPU, or realized as hardware by wired logic.

Failure Detecting Program

Figure 18:
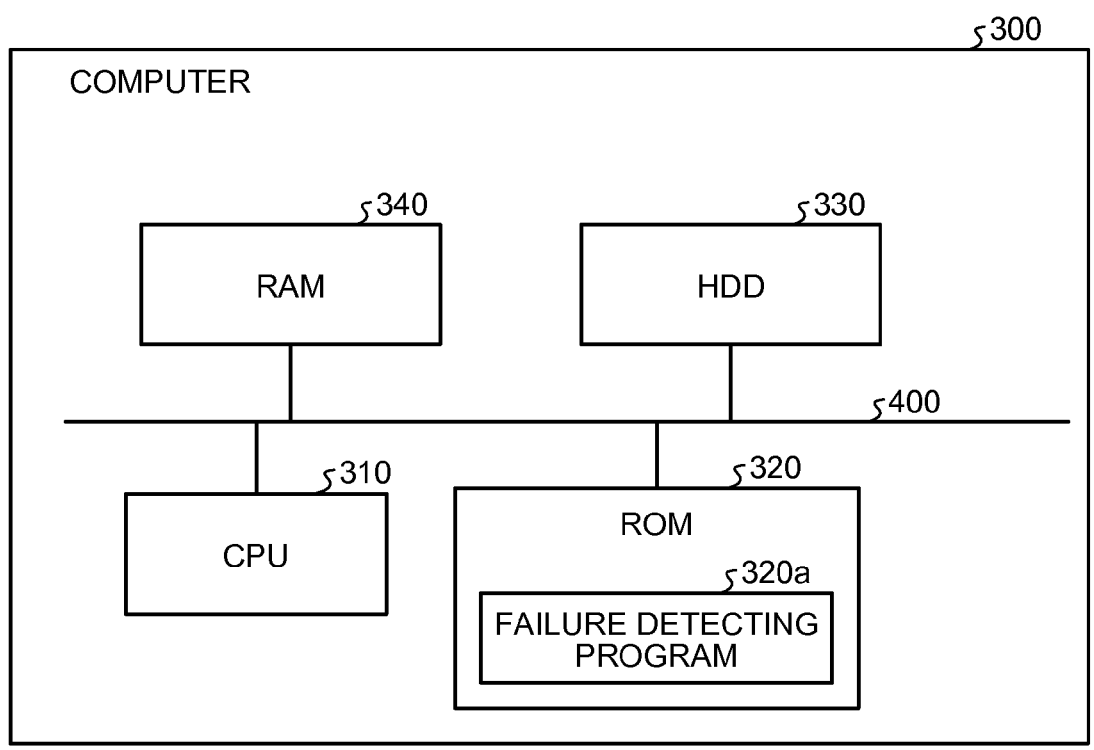
FIG. 18 is a diagram illustrating a computer that executes a failure detecting program.

Further, the various processes described in the above described embodiment may also be realized by executing, by a computer system, such as a personal computer or a work station, a program prepared in advance. Accordingly, hereinafter, an example of a computer system that executes a program having functions similar to those of the above described embodiment will be described. FIG. 18 is a diagram illustrating a computer that executes a failure detecting program.

As illustrated in FIG. 18, a computer 300 has a CPU 310, a read only memory (ROM) 320, a hard disk drive (HDD) 330, and a random access memory (RAM) 340. These units 310 to 340 are connected to one another via a bus 400.

In the ROM 320, a failure detecting program 320*a* having functions similar to those of the respective processing units of the above embodiment is stored in advance. For example, the failure detecting program 320*a* having functions similar to those of the storing unit 40, the updating unit 41, the identifying unit 42, the registering unit 43, the detecting unit 44, the notifying unit 45, and the deleting unit 46 of the first embodiment is stored therein. The failure detecting program 320*a* may be divided as appropriate.

In the HDD 330, various data are stored. For example, the HDD 330 stores therein various data used in an OS or detection of a failure.

By the CPU 310 reading and executing the failure detecting program 320*a* from the ROM 320, operations similar to those of the respective processing units of the first embodiment are executed. That is, the failure detecting program 320*a* executes operations similar to those of the storing unit 40, the updating unit 41, the identifying unit 42, the registering unit 43, the detecting unit 44, the notifying unit 45, and the deleting unit 46 of the first embodiment.

The failure detecting program 320*a* may be not stored in the ROM 320 initially. The failure detecting program 320*a* may be stored in the HDD 330 instead.

For example, the program may be stored in a "portable physical medium", such as a flexible disk (FD), a compact disk read only memory (CD-ROM), a digital versatile disk (DVD), a magneto-optic disk, or an IC card, which is inserted in the computer 300. The computer 300 then may read and execute the program therefrom.

Further, the program may be stored in "another computer (or server)" or the like connected to the computer 300 via a public network, the Internet, a LAN, a WAN, or the like. The computer 300 then may read and execute the program therefrom.

According to the embodiments of the present invention, even if messages output from a target to be monitored are changed, an occurrence of a failure is able to be detected.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A failure detecting apparatus comprising:
   a processor that executes a process comprising:
   identifying, when a new message is output from a target to be monitored, a message to be replaced, which is output from the target to be monitored before the output of the new message and is not output from the target to be monitored after the output of the new message;
   extracting a pattern including the message to be replaced, from patterns of messages stored in a storage unit, the patterns indicating occurrences of failures, and registering, in the storage unit, a pattern resulting from substitution of the message to be replaced included in the extracted pattern with the new message; and
   detecting whether or not messages output from the target to be monitored include any of the patterns stored in the storage unit.

2. The failure detecting apparatus according to claim 1, wherein the identifying includes identifying the message to be replaced, based on an average occurrence interval and a period from a last occurrence, of each message.

3. The failure detecting apparatus according to claim 2, wherein the identifying includes finding a similarity between messages that occur in a predetermined period around an occurrence of the message to be replaced and messages that occur in a predetermined period around an occurrence of the new message, and identifying a message to be replaced with a high similarity.

4. The failure detecting apparatus according to claim 1, wherein
   the storage unit stores therein a number of occurrences and a number of failure occurrences, for each of the patterns,
   the registering includes copying the number of occurrences and the number of failure occurrences of the extracted pattern and registering the copied number of occurrences and number of failure occurrences of the extracted pattern corresponding with the substituted pattern in the storage unit, and
   the process further comprises notifying a probability of occurrence of failure from the number of occurrences and the number of failure occurrences for a detected pattern.

5. The failure detecting apparatus according to claim 4, wherein when the registered pattern does not include any other new message, the registering includes copying the number of occurrences and the number of failure occurrences of the extracted pattern, and when the registered pattern includes any other new message, the registering includes copying the number of occurrences and the number of failure occurrences of the registered pattern.

6. The failure detecting apparatus according to claim 5, the process further comprising deleting the registered pattern when a probability of occurrence of failure for the registered pattern is less than a probability of occurrence of failure for the extracted pattern by a predetermined value or more.

7. A non-transitory computer-readable recording medium having stored therein a program for causing a computer to execute a process, the process comprising:
   identifying, when a new message is output from a target to be monitored, a message to be replaced, which is output from the target to be monitored before the output of the new message and is not output from the target to be monitored after the output of the new message;
   extracting a pattern including the message to be replaced, from patterns of messages stored in a storage unit, the patterns indicating occurrences of failures, and registering, in the storage unit, a pattern resulting from substitution of the message to be replaced included in the extracted pattern with the new message; and
   detecting whether or not messages output from the target to be monitored include any of the patterns stored in the storage unit.

8. A failure detecting method comprising:
   identifying, using a processor, when a new message is output from a target to be monitored, a message to be replaced, which is output from the target to be monitored before the output of the new message and is not output from the target to be monitored after the output of the new message;

extracting, using a processor, a pattern including the message to be replaced, from patterns of messages stored in a storage unit, the patterns indicating occurrences of failures, and registering, in the storage unit, a pattern resulting from substitution of the message to be replaced included in the extracted pattern with the new message; and detecting, using a processor, whether or not messages output from the target to be monitored include any of the patterns stored in the storage unit.

* * * * *